United States Patent
Wagner

(10) Patent No.: US 8,328,134 B2
(45) Date of Patent: Dec. 11, 2012

(54) CONNECTION ELEMENT FOR POWER TRANSMISSION BETWEEN A FLAP ACTUATOR AND A FLAP MOUNTED ON A WING OF AN AIRCRAFT SO AS TO SWIVEL

(75) Inventor: Alois Wagner, Dietramszell (DE)

(73) Assignee: Eurocopter Deutschland GmbH (DE)

( * ) Notice: Subject to any disclaimer, the term of this patent is extended or adjusted under 35 U.S.C. 154(b) by 449 days.

(21) Appl. No.: 12/047,863

(22) Filed: Mar. 13, 2008

(65) Prior Publication Data
US 2008/0302914 A1    Dec. 11, 2008

(30) Foreign Application Priority Data
Mar. 14, 2007   (DE) .......................... 10 2007 012 984

(51) Int. Cl.
*B64C 3/38* (2006.01)
*B64C 5/10* (2006.01)
*B64C 9/00* (2006.01)

(52) U.S. Cl. ...................................... 244/99.2; 244/99.3

(58) Field of Classification Search .................. 244/215, 244/99.2, 99.3, 99.14, 99.15, 17.11; 16/225–227
See application file for complete search history.

(56) References Cited

U.S. PATENT DOCUMENTS

| | | | | |
|---|---|---|---|---|
| 4,243,189 A * | 1/1981 | Ohgi | ............................ | 244/99.3 |
| 5,215,322 A * | 6/1993 | Enders | ........................... | 280/231 |
| 6,168,379 B1 * | 1/2001 | Bauer | ............................ | 416/23 |
| 6,648,599 B2 | 11/2003 | Preissler et al. | | |
| 6,863,245 B2 * | 3/2005 | Gessler et al. | ................ | 244/215 |
| 7,425,103 B2 * | 9/2008 | Perez-Sanchez | ............. | 403/121 |

FOREIGN PATENT DOCUMENTS

DE    10116479    10/2002

* cited by examiner

*Primary Examiner* — Philip J Bonzell
(74) *Attorney, Agent, or Firm* — Brooks Kushman P.C.

(57) ABSTRACT

A connection element for power transmission between a flap actuator and a flap mounted swivelably on a wing of an aircraft includes a first section joined to the flap actuator and a second section joined to the flap. The first and second sections are formed by a strap made of a fiber composite material.

14 Claims, 3 Drawing Sheets

CONNECTION ELEMENT FOR POWER TRANSMISSION BETWEEN A FLAP ACTUATOR AND A FLAP MOUNTED ON A WING OF AN AIRCRAFT SO AS TO SWIVEL

Priority is claimed to German Patent Application No. DE 10 2007 012 984.1, filed on Mar. 14, 2007, the entire disclosure of which is incorporated by reference herein.

The present invention relates to a connection element for power transmission between a flap actuator and a flap mounted on a wing of an aircraft so as to swivel.

BACKGROUND

Hereinafter, the general term "aircraft" will refer to fixed-wing aircraft as well as to rotary-wing aircraft, that is to say, the term "wing" encompasses the wing of a fixed-wing aircraft as well as the rotor blade of a rotary-wing aircraft. Although in principle, the invention can also be employed for fixed-wing aircraft, only a rotor blade of a rotary-wing aircraft will be examined in greater detail below.

It is a known fact that the rotor system of a helicopter is the main cause of noise and vibrations in the cabin. At the same time, the rotor system also generates a high level of outside noise, particularly during the approach for landing. These noise emissions and vibrations lead to a marked reduction in comfort for helicopter passengers and are also detrimental to the environment. Further developments in helicopter construction are aimed at greatly reducing these noise emissions and vibrations.

In the case of helicopters available on the market with their known rotor systems, the rotor blades are actuated collectively and cyclically by means of a swash plate and a mechanical linkage. The notion has become established to expand this primary rotor-blade control in order to reduce noise emissions and vibrations by using a flap installed in the area of the tip of the individual rotor blade. This flap is meant to allow individual control of the blade. The use of a controllable flap in the area of the blade that generates the uplift, preferably in the vicinity of the blade tip and on the profile trailing edge of the blade, creates the possibility for the rotor blade to continuously adapt to varying flow approach conditions during rotation of the rotor blade. This makes it possible to reduce noise emissions and vibrations caused by the rotor system.

German patent application DE 101 16 479 A1 discloses a rotor blade with a movably mounted flap. The flap is movably attached to the rotor blade by means of anti-friction bearings. The flap is actuated with a flap actuator that is configured in the form of a piezo actuator and that is arranged at a distance in a front area of the rotor blade as seen in the direction of the chord. The piezo actuator transmits its actuating power to the flap via rod-shaped connection elements. Here, the rod-shaped traction elements are mounted by means of appropriate sliding bearings.

With the known rotor blades of the above-mentioned type, the effectiveness of the flap declines and it quickly loses its functionality after a relatively short period of operation because wear and tear of the highly stressed flap bearing soon results in play. This reduces the available excursion range of the flap, the aerodynamic and mechanical flap effect decreases and the friction in the flap bearing is greatly increased. Since the sliding bearing of the rod-shaped traction elements is likewise subjected to friction, the functionality of the piezo actuator is severely impaired. Moreover, the friction has a negative effect on the control and regulation programs needed for a precise adjustment of a movable flap.

SUMMARY OF THE INVENTION

An aspect of the present invention to propose a connection element for power transmission between a flap actuator and a flap mounted on a wing of an aircraft so as to swivel, which ensures a reduction of the friction force as a detrimental force and thus a better functionality of the flap actuator.

The invention is based on the recognition that a reduction in the friction force has a positive effect on the functionality of the flap actuator.

Towards this end, the connection element for power transmission between a flap actuator and a flap mounted on a wing of an aircraft so as to swivel is firmly joined to the flap actuator by means of a first section and to the flap by means of a second section. According to the invention, the connection element is configured as a strap made of fiber composite material. Owing to the inventive configuration of the connection element as a strap made of fiber composite material, it is now no longer necessary to mount the connection element on sliding bearings. Therefore, a frictionless force transmission between the flap actuator and the flap that is to be moved is ensured in a simple manner, in other words, the negative influence of the friction-stressed sliding bearing on the functionality of the flap actuator is eliminated. Furthermore, the inventive configuration of the connection element as a strap made of fiber composite material and the resulting elimination of the sliding bearing translate into a considerable weight reduction.

Additional advantages of a connection element configured as a strap made of fiber composite material are the high stiffness in the direction of force transmission and the long service life (>2000 hours). It is also advantageous that the connection element according to the invention can be produced easily and cost-effectively and does not require any extensive maintenance.

Preferably, the second section of the connection element—as seen in the direction of the uplift—is firmly and directly joined to an upper or lower flap contour of the flap, and a middle section formed between the first and the second sections is loosely positioned over an upper or lower flap contour area as seen in the direction of the uplift. The connection of the second section of the connection element over a given surface area of the upper or lower flap contour as well as the loose positioning of the middle section of the connection element over the upper or lower flap contour area prove to be advantageous since no additional attachment elements are needed any longer as a result, and moreover, a smooth flap movement is ensured.

Whereas the first and second sections of the connection element are each configured to be tensile-stiff and rigid, the middle section of the connection element is configured to be tensile-stiff and flexible. This advantageously ensures that the connection element has the requisite high stiffness in the force-transmission direction as well as sufficient flexibility in a defined area so that a reliable operation and smooth swiveling of the flap are ensured.

According to an embodiment of the invention, the connection element consists of a plurality of unidirectional pre-impregnated fiber layers, hereinafter also referred to as prepreg layers. In this context, the prepreg layers in the first and second sections of the connection element are glued to each other and they are each separated from each other in the middle section by means of a separating film laid between two adjacent prepreg layers. In an easy manner, this inventive layered structuring of the connection element allows a targeted division of the connection elements into areas having different material properties, namely, the configuration of the first and second sections as a tensile-stiff and rigid areas and the configuration of the middle section as a tensile-stiff and flexible area.

Preferably, the connection element has a different profile thickness—as seen in the direction of the chord—that increases from the middle section towards the first section associated with the flap actuator and that decreases from the middle section towards the second section associated with the flap.

The attachment between the first or second section of the connection element to the flap actuator or to the flap can be configured to be a bonded and/or a non-positive and/or a positive joint.

Additional advantages and application possibilities of the present invention can be gleaned from the description below in conjunction with the embodiment shown in the drawing.

BRIEF DESCRIPTION OF THE DRAWINGS

The invention will be described in greater detail below with reference to the embodiment depicted in the drawing, in which.

Figure 1:
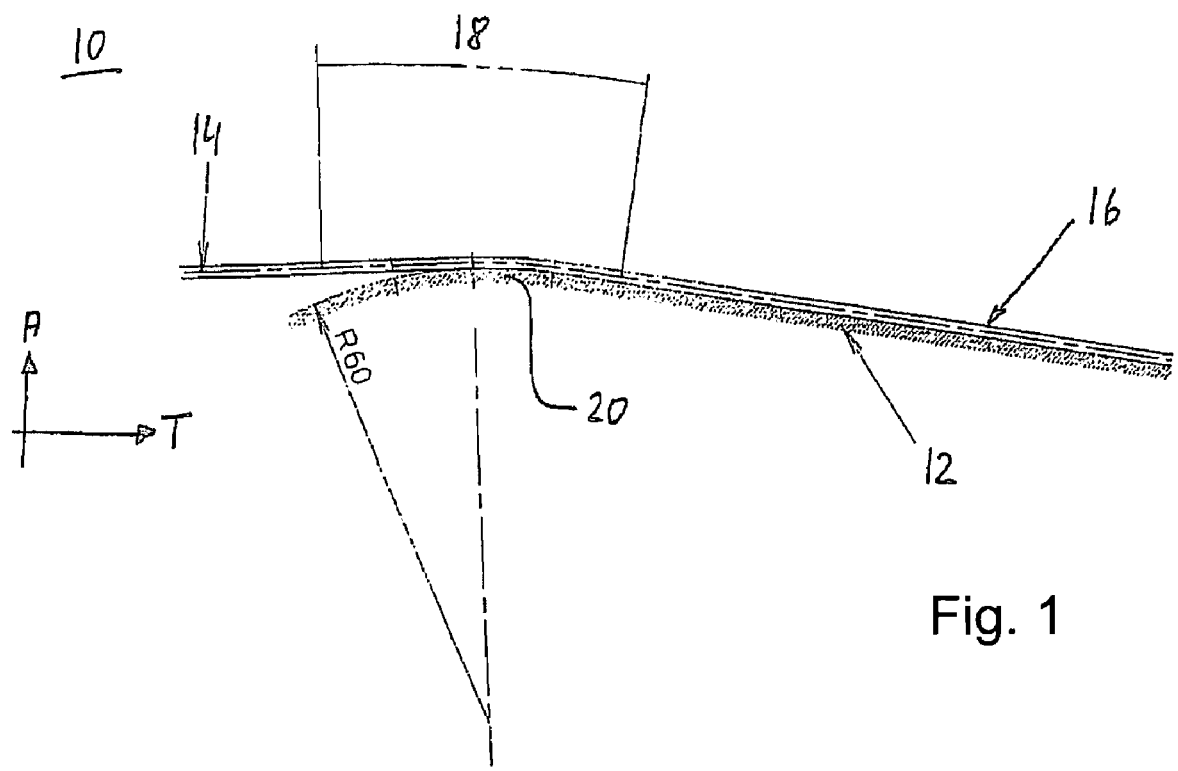
FIG. 1—a sectional depiction of the connection element according to the invention for power transmission between a flap actuator and a flap mounted on a rotor of a helicopter so as to swivel.

The terms and appertaining reference numerals compiled in the list of reference numerals below are employed in the description, in the patent claims, in the abstract and in the drawings.

DETAILED DESCRIPTION

FIG. 1 is a more or less schematic sectional view of a connection element that is designated as a whole with the reference numeral 10 and that, in a known manner, is operatively connected, on the one hand, to a flap actuator and, on the other hand, to a flap 12 that is mounted so as to swivel. A connection element 10 ensures the force transmission between the flap actuator and the flap 12 that is needed to bring about the swiveling movement of the flap 12.

A depiction of a flap actuator and of a rotor on which the flap 12 is mounted so as to swivel has been omitted for the sake of clarity.

The connection element 10 is configured here in the form of a strap made of fiber composite material. Owing to the configuration of the connection element 10 as a strap, it is possible to dispense with the sliding bearing that was commonly used up until now for the connection element. The configuration of the connection element as a strap 10 and the resulting elimination of the sliding bearing that was commonly used up until now ensure a friction-optimized and weight-optimized force transmission between the flap actuator and the flap.

As seen in the chord direction T, the strap 10 has three sections, namely, a first section 14 directed towards a flap actuator, a second section 16 directed towards the flap 12 and a middle section 18 arranged between the first and second sections 14, 16.

The strap 10 is joined in a known manner to the flap actuator via the first section 14. The second section 16 of the strap associated with the flap 12 is firmly joined to an upper contour of the flap 12 as seen in the direction of the uplift. The middle section 18 of the strap 10 is positioned loosely over an upper flap contour area 20 of the flap as seen in the direction of the uplift. In the present case, the upper flap contour area 20 is configured to be convex, having a curvature radius R60.

In order to ensure a reliable operation and smooth swiveling of the flap 12, the middle section 18 of the strap 10 is configured to be tensile-stiff and flexible, while the first and second sections 14, 16 of the strap 10 are each configured to be tensile-stiff and rigid. For this purpose, the strap 10 is laminated using a plurality of unidirectional pre-impregnated fiber layers of carbon fiber reinforced plastic (CFRP or CRP)—hereinafter also referred to as prepreg layers—arranged perpendicular to the cross sectional plane. Whereas the prepreg layers in the first and second sections 14, 16 of the strap 10 are glued to each other, the prepregs in the middle section 18 of the strap 10 are separated from each other by a separating film laid between two prepreg layers arranged on top of each other.

Figure 2:
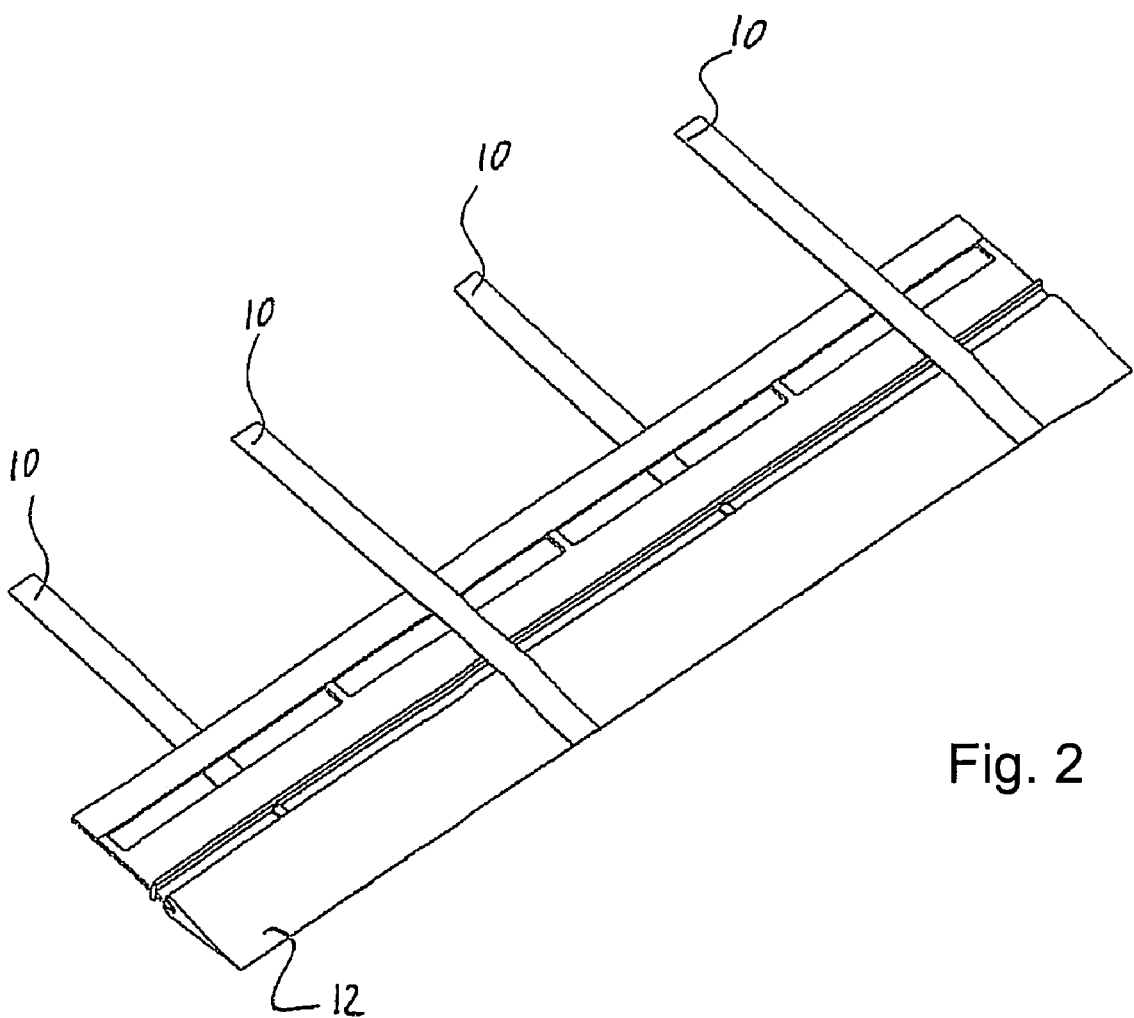
FIG. 2—a perspective view of a flap of a rotor blade.
Figure 3:
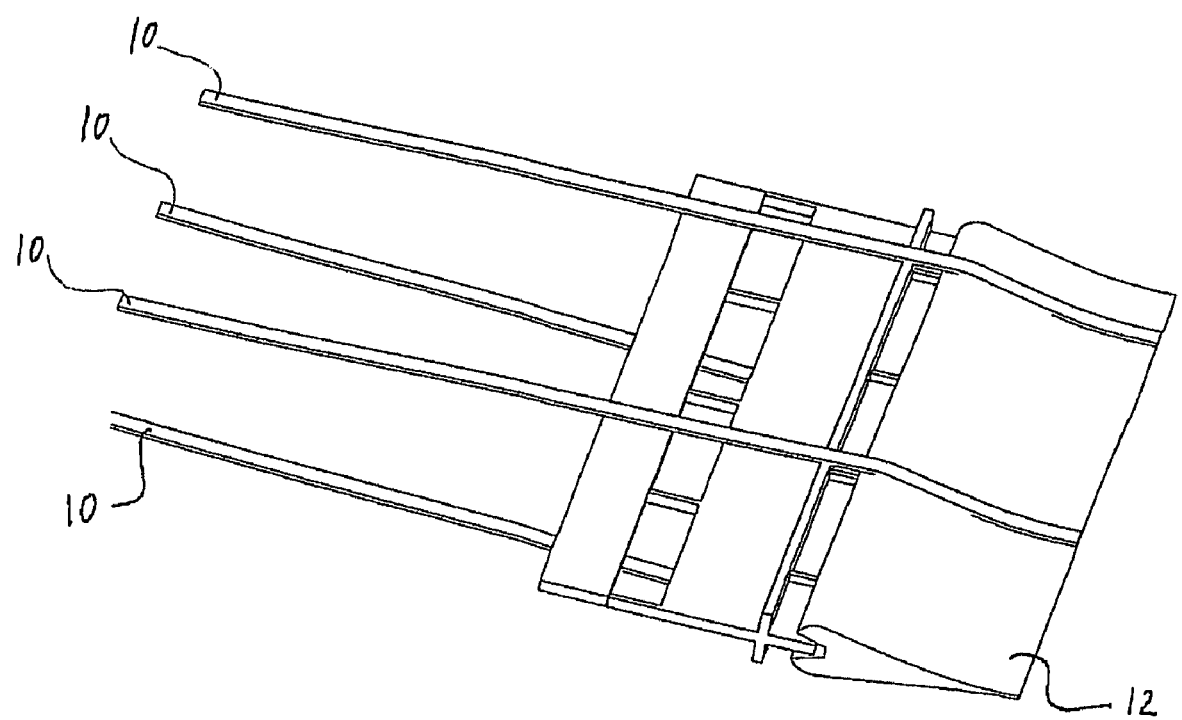
FIG. 3—another depiction of a swiveling flap of a rotor blade.

As can be especially seen in FIGS. 2 and 3, several straps 10 are provided on a flap 12. In accordance with the elaborations above, each strap 10 is joined via its first section 14 to a flap actuator (not shown here) as well as via its second section 16 over a given surface area of the second section of the connection element to the upper or lower flap area, extending between the contour area 20 and the trailing edge of the flap as shown. The middle sections 18 are loosely positioned over the upper or lower flap contour areas 20.

The connection element 10 for power transmission between a flap actuator and a flap mounted on a wing of an aircraft so as to swivel is characterized in that it has improved mechanical and kinematic properties and can be produced with less engineering work.

What is claimed is:

1. A connection element for power transmission between a flap actuator and a flap mounted at a flap leading edge in a swivelable manner on a wing of an aircraft for rotation about a flap axis, the flap having a surface area forming an upper contoured region and a surface area forming a lower contoured region relative to an uplift direction of the aircraft adjacent the flap leading edge, the flap further provided with an upper and lower surface extending between the upper and lower contoured regions and a flap trailing edge, the connection element comprising an elongated strap having:
   a first section for connection to the flap actuator;
   a second section having an elongate surface area joined to one of the upper or lower surfaces of the flap, and
   a flexible middle section disposed between the first and second sections, and overlying one of the upper and lower contoured regions of the flap;
   wherein the first, second, and middle sections of the strap are made of a fiber composite material, with the second section elongate surface firmly and directly joined to the flap in one of a friction-fit and an adhesive manner, with the middle section oriented adjacent to one of the upper and lower contoured regions in an un-joined manner so that at least a portion of the middle section cooperates with and conforms to the contoured region as the flap swivels relative to the wing of the aircraft in response to movement of the flap actuator, wherein the middle section has a trailing end which is located a significant distance in an aft direction beyond the flap axis when the flap is in a neutral horizontal position.

2. The connection element as recited in claim 1, wherein the middle section is tensile-stiff and flexurally pliable and the first and second sections are tensile-stiff and flexurally rigid.

3. The connection element as recited in claim 2, wherein the strap includes plurality of unidirectional pre-impregnated fiber layers, wherein, in the first and second sections, adjacent ones of the pre-impregnated fiber layers are glued to each other, and in the middle section, adjacent ones of the pre-impregnated fiber layers are each separated from each other.

4. The connection element as recited in claim 1, wherein the wing is a rotor blade of a rotary wing aircraft.

5. The connection element as recited in claim 1 wherein the first section and a portion of the middle section are aligned and form a tangent with the contoured surface of the flap as the flap swivels relative to the wing.

6. A pair of connection elements each as recited in claim 1, wherein a first section and a portion of the middle section of each of the pair of connection elements are aligned and form a tangent to the contoured surface of the flap to which it is attached as the flap swivels relative to the wing.

7. The pair of connection elements as recited in claim 6, wherein the tangents where the middle section of the connection elements deviates from the flap contour surfaces moves along the contour surfaces as the flap swivels relative to the wing causing the middle sections to flex.

8. A flap system for an aircraft comprising:
a section of a wing of an aircraft;
a flap mounted at a flap leading edge in a swivelable manner on the wing section for rotation about a flap axis, the flap having a surface area forming an upper contoured region and a surface area forming a lower contoured region relative to an uplift direction of the aircraft adjacent the flap leading edge, the flap further provided with an upper and lower surface extending between the upper and lower contoured regions and a flap trailing edge;
a flap actuator; and
a connection element for power transmission between the flap actuator and the flap, the connection element provided by an elongated strap having:
a first section for connection to the flap actuator;
a second section having an elongate surface area joined to one of the upper or lower surfaces of the flap, and
a flexible middle section disposed between the first and second sections, and overlying one of the upper and lower contoured regions of the flap;
wherein the first, second, and middle sections of the strap are made of a fiber composite material, with the second section elongate surface firmly and directly joined to the flap in one of a friction-fit and an adhesive manner, with the middle section oriented adjacent to one of the upper and lower contoured regions in an un-joined manner so that a portion of the middle section cooperates with the contoured region to conform to the flap as the flap swivels relative to the wing of the aircraft in response to movement of the flap actuator, wherein a forward end of the second section is located a significant distance behind the flap axis when the flap is in a neutral horizontal position.

9. The flap system of claim 8 wherein the wing is a rotor blade of a rotary wing aircraft.

10. The flap system of claim 8 wherein the first section and a portion of the middle section are aligned and form a tangent with the contoured surface of the flap as the flap swivels relative to the wing.

11. The flap system of claim 8 wherein a first section and a portion of the middle section of each of the pair of connection elements are aligned and form a tangent to the contoured surface of the flap to which it is attached as the flap swivels relative to the wing.

12. The flap system of claim 11 wherein the tangents where the middle sections of the connection elements deviates from the flap contour surface moves along the contour surfaces as the flap swivels relative to the wing causing the middle sections to flex.

13. The flap system of claim 8 wherein the connection element middle section is tensile-stiff and flexurally pliable and the first and second sections are tensile-stiff and flexurally rigid.

14. The flap system of claim 13 wherein the strap includes a plurality of unidirectional pre-impregnated fiber layers, wherein, in the first and second sections, adjacent ones of the pre-impregnated fiber layers are glued to each other, and in the middle section, adjacent ones of the pre-impregnated fiber layers are each separated from each other.

* * * * *